July 23, 1963  J. W. WHITE  3,098,674
VEHICLE BODY CONVERTIBLE FROM A FLAT BED TO A BOAT CARRIER
Filed Dec. 21, 1960  3 Sheets-Sheet 1
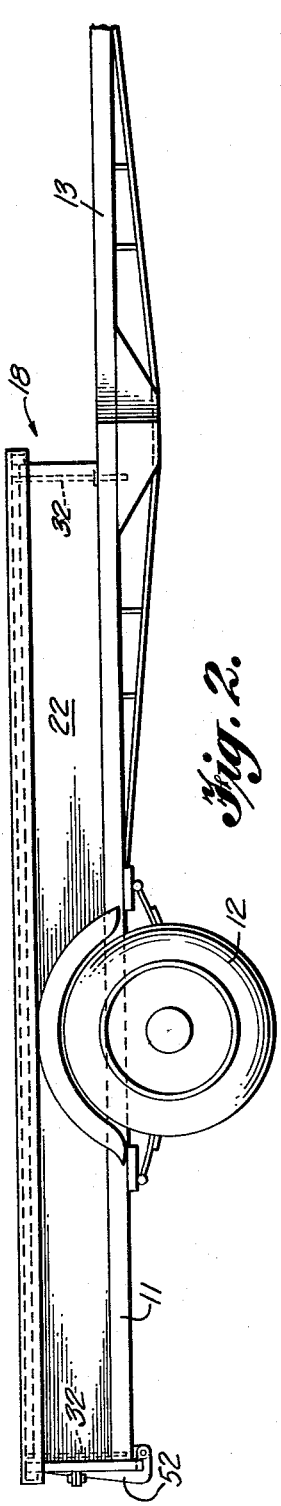
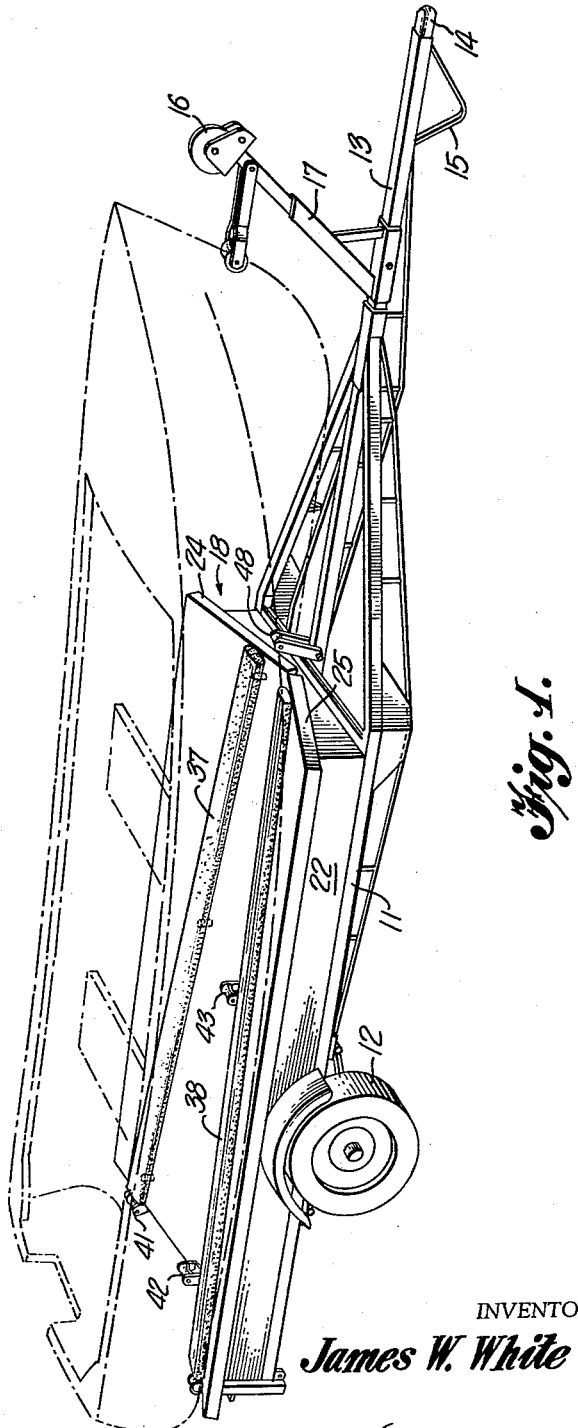
INVENTOR
*James W. White*
BY *Irons, Birch, Swindler & McKie*
ATTORNEYS

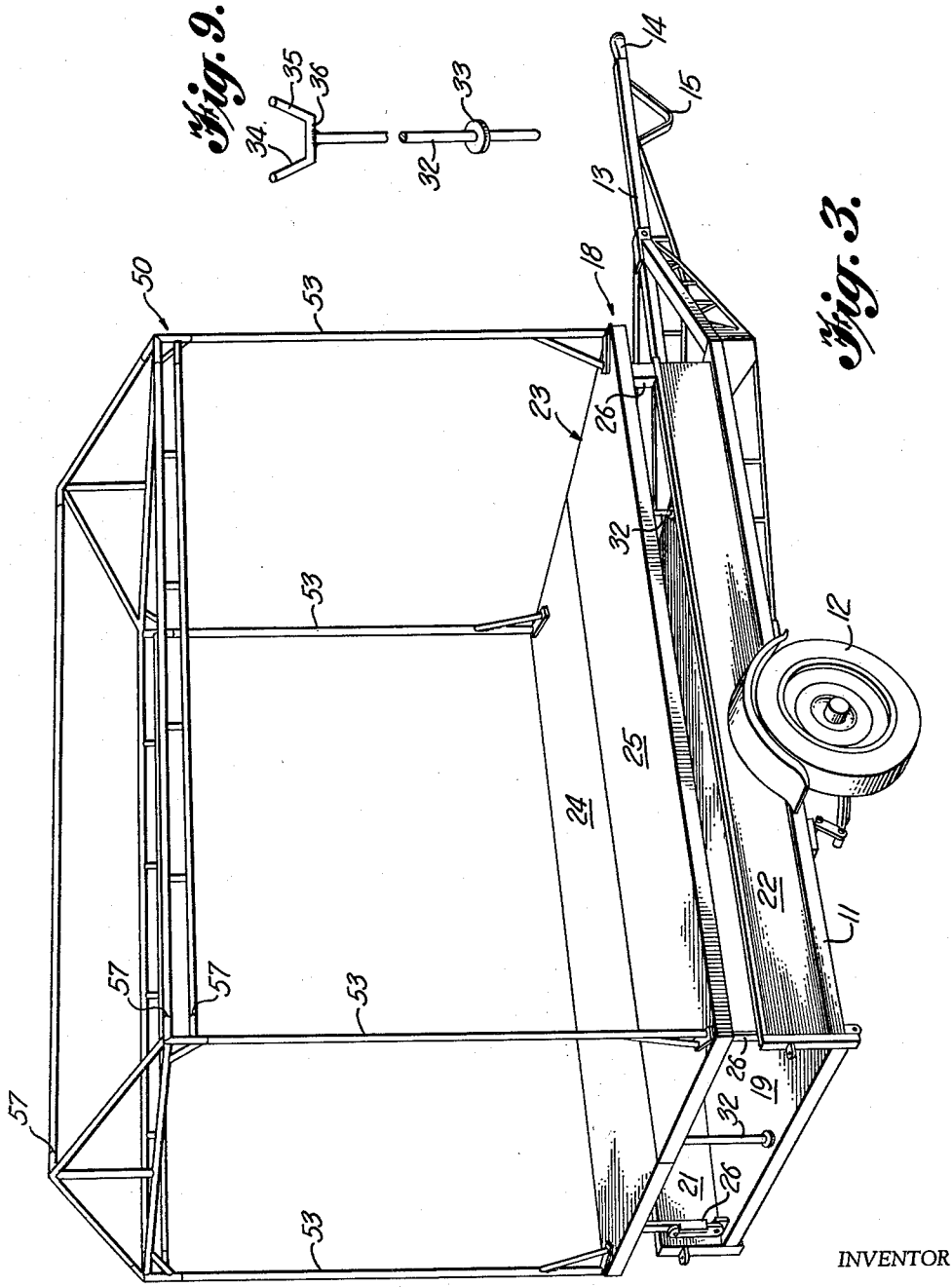

July 23, 1963  J. W. WHITE  3,098,674
VEHICLE BODY CONVERTIBLE FROM A FLAT BED TO A BOAT CARRIER
Filed Dec. 21, 1960  3 Sheets-Sheet 3
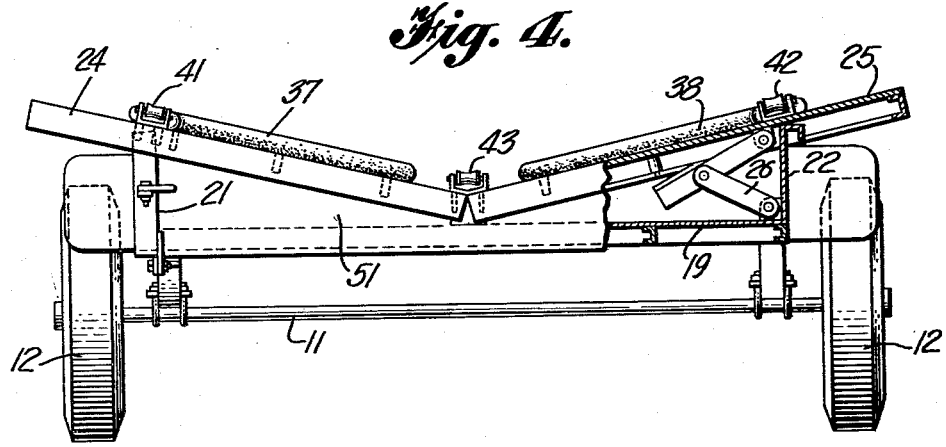
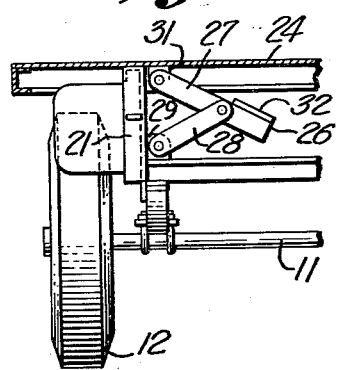
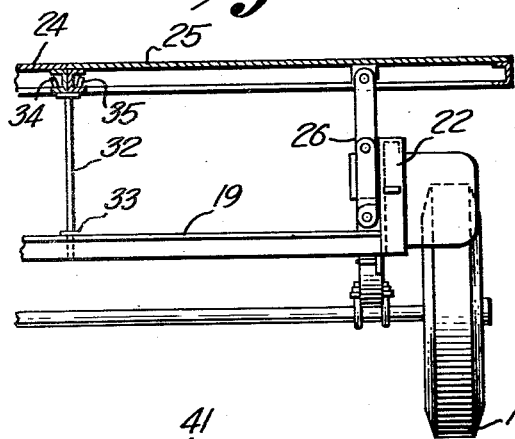
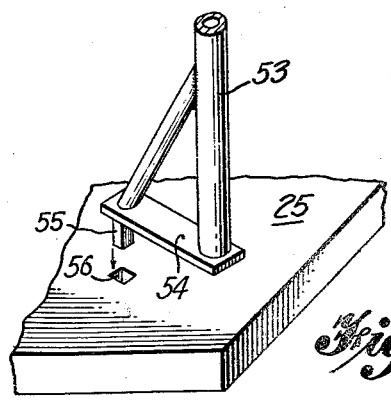
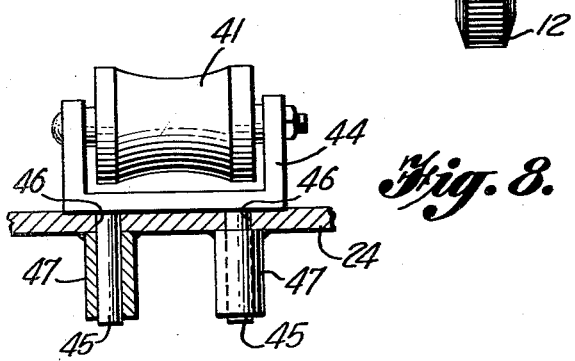
INVENTOR.
James W. White
BY
Jones, Birch, Swindler & McKie
ATTORNEYS

United States Patent Office 3,098,674
Patented July 23, 1963

3,098,674
VEHICLE BODY CONVERTIBLE FROM A
FLAT BED TO A BOAT CARRIER
James W. White, 1812 Osage, Fort Smith, Ark.
Filed Dec. 21, 1960, Ser. No. 77,324
8 Claims. (Cl. 296—23)

This invention relates to vehicle bodies and more particularly to convertible vehicle bodies for use in boating and camping activities.

In recent years there has been a sharp increase in the availability and popularity of small boats. There has been a corresponding demand for vehicle bodies particularly adapted for the transportation of such boats. Such bodies are generally characterized by a bed which is V-shaped in cross section to fit the bottom of a boat. As a consequence of this unusual configuration, boat transporting vehicles in general have had little utility for other purposes.

There have also been available heretofore various types of camping vehicles providing a flat bed surface which may be utilized for different purposes such as a picnic, game or work table or to support a shelter.

Conventionally bodies especially adapted for either transporting boats or for the described camping activities have been mounted on trailer frames. In general, persons wishing to avail themselves of the convenience offered by both types of bodies have been forced to purchase two trailers. Moreover, where both are desired on the same camping trip, two different towing vehicles have been required.

To overcome the disadvantages of the prior art it is an object of the present invention to provide an improved vehicle body which is quickly and easily convertible between a boat carrier and a flat bed.

It is another object of the present invention to provide such a convertible vehicle body wherein the flat bed may be maintained at a plurality of elevations.

A still further object of the present invention is to provide a vehicle body which is quickly and easily convertible between a boat carrier and a flat bed which may be employed as a table or as a floor for a collapsible shelter.

In general, the invention embraces a vehicle body convertible between a boat carrier and a flat bed comprising a pair of elongated flat members and means to support such members in side by side relationship for movement between alternative load-bearing positions, said members together defining a flat bed in one of said positions and a generally V-shaped boat carrier in the other of said positions.

The invention having been generally described, a preferred specific embodiment will now be set forth in detail with reference to the accompanying drawings in which:

FIGURE 1 is a perspective view of a trailer carrying a vehicle body according to the invention in condition for transporting a boat.

FIGURE 2 is a side elevation of a trailer as shown in FIGURE 1.

FIGURE 3 is a perspective view of the same trailer with the body defining a flat bed on which a collapsible shelter supporting framework is mounted.

FIGURE 4 is a rear elevation of the apparatus of the invention partially in section.

FIGURE 5 is a detail partially in section of a portion of a vehicle body according to the invention showing the toggle mechanism for supporting the sides of the load-bearing bed.

FIGURE 6 is a fragmentary view partially in section of the bed and its supporting structure with the bed in its highest elevated position.

FIGURE 7 is a detail of one of the corner connections between the collapsible shelter supporting framework and the load-bearing bed.

FIGURE 8 is a detail of one of the removable rollers which facilitates mounting and demounting of a boat on the vehicle body.

FIGURE 9 is a detail of a supporting pin for the center of the load-bearing vehicle body.

The trailer shown in FIGURE 1 is provided with a frame 11 of conventional construction and including a plurality of framing and bracing members which are shown and described only to the extent necessary to a complete understanding of the invention. The frame may be of welded metal construction of the strength requisite to support a load of the desired magnitude. The frame is mounted on wheels 12 and includes an elongated pulling tongue 13 which is equipped with a trailer hitch 14 and a leg 15 to support the tongue when the hitch is disconnected. The usual winch 16 and adjustable supporting post 17 for the winch are removably mountable on the tongue 13. A trailer body 18 is rigidly connected to the frame 11 as by bolting or welding. Resting directly on the frame 11 is a floor 19. If desired rubber padding may be positioned between the body and frame. The body also includes a pair of side walls 21 and 22 which are rigidly fixed in upstanding positions on opposite sides of the floor 19.

Spaced above the floor 19 is a load-bearing bed 23 which comprises two separate flat portions in the form of plate members 24 and 25. The outer sides of the bed portions 24 and 25 normally rest on the top of the side walls 21 and 22 respectively. In addition the bed portions 24 and 25 are connected immediately inwardly of the side walls 21 and 22 respectively to the floor 19 by a toggle mechanism 26 which comprises a pair of pivotally connected links 27 and 28. The link 28 is pivotally connected at its lower end to a bracket 29 which is mounted in the corner between the floor 19 and the side wall. The link 27 is pivotally connected at its upper end to a bracket 31 which is fixed to the bottom of the load-bearing bed. The link 27 extends beyond its connection to the link 28 and has attached thereto a transverse flange 32. With the toggle mechanism 26 in its collapsed position, as shown in FIGURE 5, the bed portion 24 or 25 as the case may be rests on the top of the side wall 21 or 22. Each of the bed portions 24 and 25 is pivotable about its connection to the toggle mechanism so that the inner sides of the bed portions are movable vertically from a depressed position, as shown in FIGURE 4, resting on or near the floor 19 to an elevated position as shown in FIGURE 5, where the bed portions 24 and 25 define a horizontal flat bed.

With the toggle mechanism in an extended position as shown in FIGURE 6, the outer sides of the bed portions 24 and 25 are elevated above the side walls 21 and 22 and are supported by the toggle mechanisms which function as columns. Any suitable latch may be provided to lock the toggle mechanism in its extended position to prevent untimely collapse of the mechanism. When the bed portions are in the position shown in FIGURE 6, their inner sides may be elevated so that the two portions together define a flat horizontal bed at an elevated position. The inner sides of the bed portions are supported at that elevation by a rod 32, the lower end of which projects into an opening in the floor 19 and is provided with a flange 33 which rests on the floor to support the rod. The upper end of the rod 32 is bifurcated to provide a pair of pins 34 and 35 which project into openings in the bed portions 24 and 25 respectively. A cross member 36 is affixed at the base of the pins 34 and 35 to support the bed portions. As shown in FIGURE 6, the pin 32 and the toggle mechanism 26 in its extended position support the inner and outer sides, respectively, of the bed portions at the same elevation. Toggle mechanisms 26 and pins 32 are provided at both ends of the bed and at intermediate positions if desired.

Pins which are shorter but otherwise identical to the pins 32 may be substituted therefor to support the inner sides of the bed portions 24 and 25 at the same elevation as the outer sides of the bed portions are supported when the toggle mechanism 26 is collapsed as shown in FIGURE 5. It will be understood that by making the flange 33 adjustable, as by providing a threaded connection between such flange and the rod 32, the same pin may be employed to support the inner sides of the bed portions at either of the elevations shown in FIGURES 5 and 6. Moreover, various other equivalent supporting structures may be employed.

When the center of the load-supporting bed is depressed as shown in FIGURE 4, the bed defines a boat carrier. A pair of removable elongated pads 37 and 38 may be mounted on the bed portions 24 and 25. Each pad comprises a bar covered by fabric, rubber or other soft material. The pads may be attached, for example, by pins which are fixed thereto and descend into suitable openings in the bed. As shown in FIGURE 1, the pads 37 and 38 converge toward the front of the bed to provide a support configuration more closely corresponding to the bottom of a typical boat. To facilitate mounting and demounting of the boat a pair of rollers 41 and 42 may be removably attached at the rear of the pads 37 and 38 respectively. An additional roller 43 for the keel of the boat may be mounted at the center of the bed as shown in FIGURE 1. These rollers may be attached to the bed as shown in FIGURE 8, by mounting the roller on a yoke 44 to which a pair of pins 45 are connected to removably descend into a pair of openings 46 in the bed and into reinforcing sleeves 47 welded to the bottom of the bed. A further keel roller 48 may be connected to the tongue 13 in front of the bed. Conventional spring tie-downs may be employed to secure the stern of the boat to the trailer.

Removable end walls 51 may be mounted at the front and rear of the body to provide support for the ends of the bed portions 24 and 25 when in depressed position as shown in FIGURE 4. Further, the toggle mechanisms 26 are easily disconnected so that the entire load-bearing bed may be removed. In that condition a removable tail gate 52 (FIGURE 2) and a removable front wall (not shown) may be mounted on the trailer so that the body defines a conventional box-shaped cargo space for the transportation of luggage or the like.

If desired, rubber pads may be positioned between the bed portions 24 and 25 and the side and end walls of the body. When the bed portions 24 and 25 are positioned to define a flat bed surface, a collapsible shelter-supporting framework may be mounted on top of the bed as shown in FIGURE 3. Such framework includes upstanding columns 53 which, as shown in FIGURE 7, are provided with foot flanges 54 and squared bottom protrusions 55 which drop into corresponding openings 56 in the corners of the bed to support the framework. The framework is provided with telescoping connections 57 to permit the entire framework to be disassembled and stored in the space between the bed and the floor 19. Other items such as a barbecue grill, oars, fishing equipment and the like may also be stored in such space.

A fabric covering of any suitable type may be mounted on the framework. If desired, only a fabric roof may be provided to shade the flat bed when in use as a picnic table or the like. Alternatively, fabric walls with or without windows may be added to provide a completely enclosed sleeping shelter.

The flat bed may be employed at the most convenient elevation for any of a variety of purposes such as a picnic table, a game table, a work platform or the like.

The floor 19 and the bed 23 may be made of any suitable material such as sheet metal, marine plywood, fiberboard or other wood, plastic or the like. If desired, a rubber mat may be mounted on the floor 19 and/or the bed 23. Such mat could be corrugated or smooth depending on the particular intended use.

Various storage bins or racks may be mounted on the frame in front of the bed for such items as an ice box and a water tank. Steps may be provided to facilitate ascent to the flat bed. The trailer may be wired for electricity for lights and appliances. Many other features can be added as desired.

There has been illustrated and described what is considered to be a preferred embodiment of the invention. It will be understood, however, that various modifications may be made by persons skilled in the art without departing from the scope of the invention which is defined by the appended claims.

I claim:

1. A vehicle body convertible between a boat carrier and a flat bed comprising a frame, a pair of road wheels supporting said frame and rotatable about an axis transverse to the direction of movement of the vehicle body, a pair of elongated flat members, each of said members extending a substantial distance both forwardly and rearwardly of said axis and having a dimension transverse to said axis substantially greater than its corresponding dimension parallel to said axis, means carried by said frame to support said members in side by side relationship for movement between alternative load-bearing positions, said members together defining a flat bed in one of said positions and a boat carrier having a generally V-shaped cross section parallel to said axis in the other of said positions, and elongated bar means providing boat supporting pads above the upper surface of said members and having releasable connections to said members, said bar means including forward portions spaced apart relatively narrowly and oriented to support the narrow, steeply sloped bottom at the bow of a boat and rearward portions spaced apart relatively widely and oriented to support the wide relatively flat bottom at the stern of a boat.

2. A vehicle body as recited in claim 1 wherein said supporting means is shiftable to maintain said flat bed at a plurality of elevations.

3. An apparatus as recited in claim 1 wherein said elongated bar means comprise a pair of bars extending longitudinally along the upper surface of said members and inclined toward each other forwardly of said members.

4. A vehicle body convertible between a boat carrier and a flat bed comprising a frame, a pair of road wheels supporting said frame and rotatable about an axis transverse to the direction of movement of the vehicle body, a pair of elongated flat members, each of said members extending a substantial distance both forwardly and rearwardly of said axis and having a dimension transverse to said axis substantially greater than its dimension parallel to said axis means carried by said frame to support the outer sides of said members for pivoted movement along an axis transverse to said wheel axis to permit the inner sides of said members to be alternatively elevated so that said members together define a flat bed and depressed so that said members define a boat carrier having a generally V-shaped cross section parallel to said wheel axis, means carried by said frame to support said inner sides in either of said elevated or depressed positions, and elongated bar means providing boat supporting pads above the upper surface of said members and having releasable connections to said members, said bar means including forward portions spaced apart relatively narrowly and oriented to support the narrow, steeply sloped bottom at the bow of a boat and rearward portions spaced apart relatively widely and oriented to support the wide relatively flat bottom at the stern of a boat.

5. An apparatus as recited in claim 4 wherein said elongated bar means comprise a pair of bars extending longitudinally along the upper surface of said members and inclined toward each other forwardly of said members.

6. An apparatus as recited in claim 4 wherein each of said supporting means is shiftable to maintain said flat bed at a plurality of elevations.

7. An apparatus as recited in claim 6 wherein said means for supporting said outer sides comprises a toggle mechanism.

8. A trailer comprising a frame having an elongated towing tongue, a pair of road wheels supporting said frame and rotatable about an axis transverse to the direction of movement of the vehicle body, a winch mounted on said tongue, a pair of elongated flat members, each of said members extending a substantial ditsance both forwardly and rearwardly of said axis and having a dimension transverse to said axis substantially greater than its corresponding dimension parallel to said axis, means carried by said frame to support the outer sides of said members for pivoted movement along an axis transverse to said wheel axis to permit the inner sides of said members to be alternatively elevated so that said members together define a flat bed and depressed so that said members define a boat carrier having a generally V-shaped cross section parallel to said wheel axis, means carried by said frame to support said inner sides in either of said elevated or depressed positions, and a collapsible shelter supporting framework removably mountable on said flat bed in said elevated position, and frame providing a flat surface underlying said flat members to define between said flat surface and said members a storage compartment for the collapsed framework.

References Cited in the file of this patent

UNITED STATES PATENTS

| | | |
|---|---|---|
| 176,137 | Jacobs | Apr. 18, 1876 |
| 2,660,443 | Miller | Nov. 24, 1953 |
| 2,766,897 | Alker | Oct. 16, 1956 |

FOREIGN PATENTS

| | | |
|---|---|---|
| 459,746 | Canada | Sept. 20, 1949 |
| 935,171 | Germany | Nov. 10, 1955 |

OTHER REFERENCES

Mastercraft Publication, May 13, 1954 (8 pages, copy in Div. 47).